United States Patent
Knobloch et al.

(10) Patent No.: US 6,871,709 B2
(45) Date of Patent: Mar. 29, 2005

(54) STRIP-TILL PRIMARY TILLAGE SYSTEM

(75) Inventors: Dean Knobloch, Goodfield, IL (US); Daryl T. Johnson, Grinnell, IA (US)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/353,493

(22) Filed: Jan. 29, 2003

(65) Prior Publication Data

US 2003/0178209 A1 Sep. 25, 2003

Related U.S. Application Data

(60) Provisional application No. 60/353,898, filed on Feb. 2, 2002.

(51) Int. Cl.$^7$ .............................................. A01B 49/02
(52) U.S. Cl. ....................... 172/145; 172/167; 172/705; 172/701
(58) Field of Search ................................ 172/705, 139, 172/701, 145, 146, 163, 707, 773, 167; 111/18

(56) References Cited

U.S. PATENT DOCUMENTS

| | | | |
|---|---|---|---|
| 486,849 A * | 11/1892 | Caldwell | 172/167 |
| 2,734,439 A * | 2/1956 | Padrick | 172/156 |
| 2,771,044 A * | 11/1956 | Putifer | 111/189 |
| 3,935,906 A | 2/1976 | Neal et al. | 172/177 |
| 4,024,921 A * | 5/1977 | Tibbs, II | 172/146 |
| 4,088,083 A * | 5/1978 | Dail et al. | 111/13 |
| 4,285,284 A * | 8/1981 | van der Lely | 111/188 |
| 4,418,761 A * | 12/1983 | Dietrich et al. | 172/271 |
| 4,524,837 A | 6/1985 | Harden | 172/156 |
| 4,548,277 A * | 10/1985 | Dietrich et al. | 172/265 |
| 4,574,715 A * | 3/1986 | Dietrich et al. | 111/123 |
| 5,333,694 A * | 8/1994 | Roggenbuck et al. | 172/156 |
| 5,474,135 A * | 12/1995 | Schlagel | 172/151 |
| 5,524,711 A * | 6/1996 | Harris | 172/67 |
| 5,529,128 A * | 6/1996 | Peterson et al. | 172/145 |
| 5,622,227 A * | 4/1997 | McDonald | 172/146 |
| 5,623,997 A * | 4/1997 | Rawson et al. | 172/156 |
| 5,797,460 A | 8/1998 | Parker et al. | 172/151 |
| 6,012,534 A | 1/2000 | Kovach et al. | 172/196 |
| 6,068,061 A | 5/2000 | Smith et al. | 172/139 |
| 6,102,132 A | 8/2000 | Schimke | 172/498 |
| 6,425,445 B1 | 7/2002 | Tarver, III | 172/166 |
| 6,554,078 B1 * | 4/2003 | McDonald | 172/69 |
| 6,681,868 B2 * | 1/2004 | Kovach et al. | 172/701 |

* cited by examiner

Primary Examiner—Victor Batson
(74) Attorney, Agent, or Firm—Rebecca Henkel; Brant T. Maurer

(57) ABSTRACT

An agricultural tillage implement that employs multiple apparatus to carry out a strip-till farming operation is disclosed. A tillage shank runs a point through the compaction layer to fracture and loosen the soil, forcing it upwardly and outwardly where a pair of angled soil-gathering blades, located adjacent the shank, redirect the soil into a newly created berm. A trailing conditioning rotary reel having a particular cross-sectional profile forms the soil into a uniform raised berm ideally suited for planting.

12 Claims, 3 Drawing Sheets

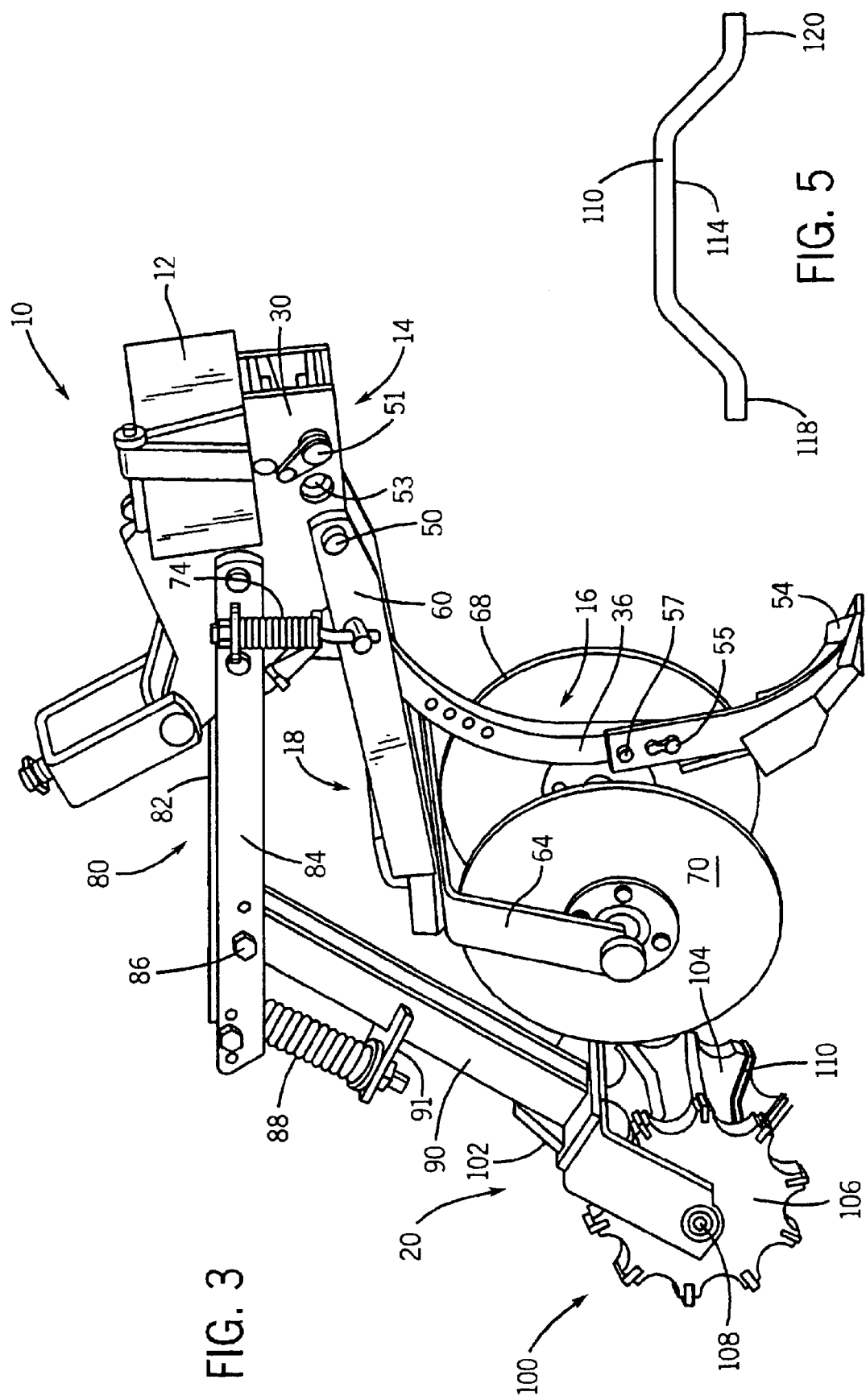

STRIP-TILL PRIMARY TILLAGE SYSTEM

CROSS-REFERENCE TO RELATED APPLICATIONS

This application claims the benefit of co-pending U.S. Provisional Application Ser. No. 60/353,898, filed Feb. 2, 2002. This application is also related to U.S. patent application Ser. No. 10/353,492 entitled "Strip-Till Conditioning Rotary Reel" filed on the same date as this application and in the name of the same inventors.

BACKGROUND OF THE INVENTION

The present invention relates generally to an agricultural strip-till implement, and more particularly to such an implement that represents a tillage system using a combination of coulters, tillage shanks, soil-gathering blades, and conditioning rotary reels, to produce an ideal tilled strip ready for planting seed with no additional passes. This implement provides improved crop residue management and better soil tilth resulting in superior seedbed conditions.

No-till farming is generally performed without any fall or spring tillage prior to planting. No-till planters are generally equipped with a row cleaner to move the previous year's residue out of the path of the row unit that places the seeds in the soil. Most no-ill planters also have a wavy coulter that operates approximately at the same depth as the seeds are planted. The waves on the coulter provide some minimal tillage to allow the planter to operate in loosened soil. In many soil conditions, the coulter does not loosen the dense soil that has not been previously tilled. Sidewall compaction occurs—that is, the openers press the soil sideways to allow a slot to drop the seeds in. This soil becomes difficult for the closing wheels to make into a mellow condition for good seed-to-soil contact. Poor seed germination and emergence, along with poor root development is a common yield limitation of no-till and some strip-till operations caused often by compacted soil with limited or poorly distributed pore spacing (to hold air and water). Proper pore size and distribution is critical for air and water exchange, which improves potential water infiltration and utilization—essential for healthy plant development. Familiar strip-till operations and implements have exhibited these limitations because they have heretofore not created a seedbed of sufficient size and soil tilth to permit healthy root and plant development. It is the purpose of the implement and components of the instant invention to create a seedbed with all the characteristics and features necessary to produce high yielding healthy crops.

Strip-till is an emerging farming practice that is evolving primarily out of no-till farming, and generally can be described as tilling a narrow strip of soil, that is followed by a planter row unit directly in each of the strips. Initial strip-till attempts were undertaken by using conventional anhydrous ammonia applicators, which typically used a coulter, knife mounted to shank, double disc sealer, and was equipped with markers to till/layout the strips to be planted on in the spring. The shanks, or knives were placed on a toolbar with the same row width as on the planter. For example, if a farmer has an 8-row 30" planter, he would use an 8-row strip-tillage unit to till the strips on 30" centers. This was a good start, but it was soon realized that a strip needs more soil movement, more residue flow, and a reduction in the clod size in the seedbed. The anhydrous ammonia system was stressed to do the additional tillage, handle the residue and condition the seedbed for ideal plant seed-to-soil contact.

The need is to provide tillage in the strip to increase fracture and air pore space and thereby make available adequate root growth area to support a highly productive plant. This loosening is extremely important, particularly in areas of the ground that have been compacted by heavy rains, high traffic areas, or on the end rows of the ground where traffic is often concentrated.

Depending upon soil types, moisture content of the soil, or compaction, the soil forming the strip is made up of large clods or big chunks of soil and holes where soil chunks were displaced. The need has thus developed for a conditioning rotary reel to reduce the clod size and make the strip more uniformly level along its length, thus filling in and leveling the soil strip.

Strip-tilling is generally done in the fall of the year. Anhydrous ammonia, liquid and/or dry fertilizer can be placed in the strip at the same time that the tillage is being performed.

When loosening firm or compacted soil, the tillage point will tend to explode soil upwardly and outwardly creating clods or chunks of soil. Uniform density throughout the berm is ideal for optimum seed-to-soil contact. For proper seed-to-soil contact and uniform moisture, it is preferred that the berm be relatively free of large clods and large air pockets between the clods. This creates the need for a device to reduce the clod size and make the strip more consistent in soil density without air pockets or large protruding clods.

It would be advantageous to provide a strip-till system that overcomes the problems, and improves upon the shortcomings, of the prior art.

SUMMARY OF THE INVENTION

It is an object of the instant invention to provide a strip-till system/implement that overcomes the problems and improves upon the shortcomings of the prior art.

It is another object of the instant invention to provide a strip-till system/implement with improved seedbed preparation features and characteristics.

It is another object of the instant invention to provide an agricultural tillage implement that is designed to perform complete tillage of the soil in a single pass while leaving a raised-berm seedbed.

It is another object of the instant invention to provide an agricultural tillage implement that employs a novel seedbed conditioning rotary reel, thus creating an improved seedbed in which to grow crops such as corn.

It is still another object of the instant invention to provide a novel seedbed conditioning rotary reel that will create a much-improved seedbed in which to grow crops.

It is a further object of the instant invention to provide a strip-till system with an improved relationship between the tillage point, gathering blades, and a conditioning rotary reel.

It is a further object of the instant invention to provide a strip-till system with a uniquely contoured conditioning rotary reel.

It is a further object of the instant invention to provide an improved strip-till system wherein the gathering blades are widely space and positioned along side the knife to gather substantially all the soil that is exploded by the knife and maintain the ability to handle the higher amounts of residue in today's high production farming.

It is a still further object of the instant invention to provide an improved strip-till system wherein the gathering blades are mounted to the shank mount so that: (1) the further forward gathering blade pivot allows for vertical movement with less rearward movement, (2) the blades do not substantially pivot rearwardly as the depth increases as in previous systems (and thus previous systems do not capture all the soil) as operating depth changes due to ground profile, and (3) the blades stay in the ground when the shank trips (unlike previous systems).

It is an even still further object of the instant invention to provide an improved strip-till system wherein the soil coming off the gathering blades is oriented into a relatively narrow raised band of soil and the conditioning rotary reel is positioned fore-and-aft to contain all the soil within the conditioning rotary reel, providing better conditions for the planter, to improve seed-to-soil contact.

It is an even still further object of the instant invention to provide an improved strip-till system with a conditioning rotary reel carefully positioned fore-and-aft to gather/contain soil from the blades:

If too close, the conditioning rotary reel will plug;

If too far rearward, then soil will overshoot outside of the conditioning rotary reel, thus reducing strip height;

It is another objective of the instant invention to provide a strip-till implement comprised of several working units, each made up of various elements or apparatus, assembled in a unique combination, or system, to create an ideal field condition, or seedbed, for growing plants. An improved soil profile allows roots to expand into a greater volume of soil and obtain more nutrients, especially during the most critical times of the plant production cycle. Soil nutrient and water availability is foremost a function of good soil tilth. When the root zone has the ideal balance of minerals and organic matter and pore spacing, the plants thrive.

Slow seed germination and non-uniform plant stands, caused by seedbeds that are too cold, wet or dry, or poor seed-to-soil contact, are other common yield limitations in no-till and strip-till farming. By creating a berm with the implement of the instant invention, usually 2 to 4-inches above the unworked soil surface at planting, the seedbed can dry down and warm up faster. This allows for earlier planting, improved seed-to-soil contact, and more uniform germination, thus more uniform stands that utilize sunlight, water and nutrients more effectively.

These and other objects and objectives are attained by providing an agricultural tillage implement that employs multiple apparatus to carry out a strip-till farming operation. A tillage shank runs a point through the compaction layer to fracture and loosen the soil, forcing it upwardly and outwardly where a pair of angled soil-gathering blades, located adjacent the shank, gathering and orienting the soil back into a newly created berm. A trailing conditioning rotary reel having a particular cross-sectional profile forms the soil into a uniform raised berm ideally suited for planting.

BRIEF DESCRIPTION OF THE DRAWINGS

FIG. 3 is a partial right front perspective view of the working unit shown in FIGS. 1 and 2;

FIG. 5 is a plan view of the conditioning rotary reel bar 110.

DETAILED DESCRIPTION OF THE PREFERRED EMBODIMENT

In the following description, right hand and left hand references are determined by standing at the rear of the machine and facing in the direction of forward travel. Also, in the following description, it is to be understood that such terms as "forward," "left," "upwardly," etc., are words of convenience and are not to be construed as limiting terms.

For purposes of discussion, the term "working unit" will be used herein to refer to a grouping of apparatus, for example as shown in FIG. 3, that engage the ground in concert to accomplish a certain tasks. In the case of the instant invention, the task accomplished is the creation of an improved strip-till seedbed in the form of a raised berm superiorly suited for planting.

Figure 1:
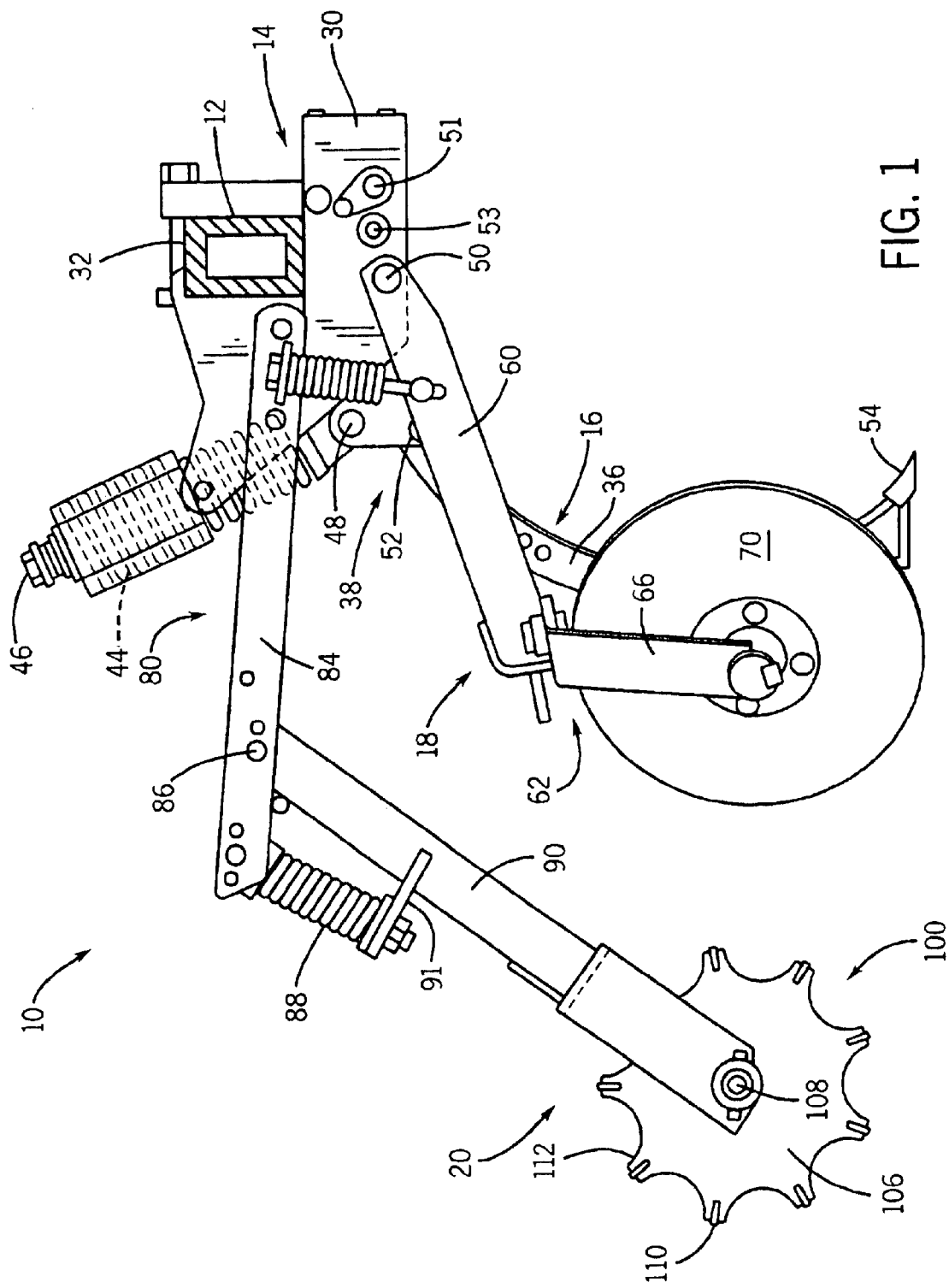
FIG. 1 is a side elevational view of a working unit of an implement embodying the strip-till primary tillage system of the instant invention.

Referring now to FIG. 1, reference numeral 10 generally designates the preferred embodiment of the working unit of the instant invention. In this figure, the various ground-engaging apparatus are shown in a raised or transport position. For comparison, in the working position the tillage point would be in the ground several inches with the blade and conditioning reels assemblies generally at ground level. The working unit 10 is attached to an implement frame adapted to be drawn across the ground by a tractor, the forward direction to the right in FIG. 1. The implement frame conventionally includes a long, main tubular frame member, or toolbar, 12 that extends transversely to the direction of travel the desired width for the number of working units chosen. Toolbar 12 may comprise one or more sections that, in wider configurations, fold up into a more compact "package" for transport and storage. The location of the working units may be changed when it is desired to alter the spacing between adjacent working units, i.e., the working units may be relocated relative to one another along the toolbar. Typical implements have 6, 8, 12, 16 or more working units mounted to the toolbar at lateral spacings of 30–36 inches or as determined by planter row spacing. This side-by-side arrangement of multiple working units, each operating to create a seedbed row or a row of crops, is sometimes referred to as an "indexed" system.

The working unit 10, described with reference to FIGS. 1–3, comprises four basic components: (1) a toolbar mounting assembly 14, (2) shank assembly 16, (3) soil gather blade assembly 18, and (4) conditioning rotary reel assembly 20.

Toolbar mounting assembly 14 is comprised of a heavy-gauge steel irregularly shaped coupler 30 with a transverse adjustable opening, or track, 32 therethrough that is fitted to the toolbar 12. The coupler 30 is sufficiently rigid and affixed to the toolbar such that the remainder of the basic components form a working unit supported by the toolbar.

Shank assembly 16 is comprised of shank 36, a shank bracket 38 including a pair of side plates 40, 42 affixed to coupler 30 of the toolbar mounting assembly 14, a compression spring 44 affixed at the top end to coupler 30 at 46 and to shank bracket 38 at the bottom end by bolt 48. The shank bracket 38 is pivotably affixed to toolbar coupler 30 by pin 51 such that the shank 36 may pivot a distance limited by the amount that spring 44 can be compressed. Shank 36 is affixed to shank bracket 38 by bolts 52 and 53. Shank 36 is formed of heavy plate stock having a thickness of about 1-¼ inches, although this dimension is not critical to the instant invention. The shank 36 is characterized herein as being generally curved; however, other configurations could prove satisfactory. In any event, shank 36 is shown to extend forwardly at the base where there is located a ground-breaking tillage point 54. The tillage point 54 is commonly referred to as a fertilizer knife to accommodate anhydrous ammonia and or other product nutrients. Tillage point 54 is normally run in the range of about 5 to 9-inches deep. The point runs in the compaction layer, fractures the layer and relocates the soil particles. Shank 36 is adjustable vertically by raising and lowering the toolbar in known manner. To protect the shank 36 and other components of the implement 10 from severe damage, tillage point 54 is provided with a shear bolt 55 that fails upon being subjected to a predetermined force created by impact between the point 54 and a relatively immovable object such as a rock, tree root or the like. Failure of shear bolt 55 allows point 54 to pivot rearwardly about bolt 57.

A gathering blade bracket 60 is rigidly fixed at the lower end to blade yoke 62 and at the upper end to coupler 30 by the pivot bolt 50. Yoke 62 has two downwardly extending yoke arms 64, 66 rotatably attached, respectively to blades 68 and 70. These blades may be of any suitable type; however, concave disc blades are preferred. The blades are angled inwardly, front to back, to gather the soil exploded by the shank 36 and redirect it inwardly toward the conditioning rotary reel. A pair of adjustable compression springs 72, 74, one on each side of coupler 30 are affixed at the top end to support arm 80 of the conditioning rotary reel assembly 20 and at the lower end to gathering blade bracket 60. Thus, the blades are biased downwardly. The length of the gathering disc bracket 60 is such that the blades 68, 70 are positioned substantially adjacent and slightly rearwardly to the shank 36 and the groundbreaking point 54. By positioning the pivot point 50 of the gathering blade assembly 18 forward of the shank 36 the gathering blades are caused to move mostly upwardly when the depth of tillage point 54 changes (as it constantly does when crossing a field), thus maintaining the positional relationship between the gathering discs and the shank. More specifically, as tillage point 54 breaks through the ground, it creates a flow of soil from each side of shank 36, much like snow flowing off of a V-shaped snowplow. The gathering blades 68, 70 are positioned adjacent and slightly rearwardly of the shank such that they engage this flow of soil and redirect it toward the path of the shank for treatment by the conditioning reel. The pivot point of the gathering blade assembly maintains the positional relationship between the blades and the shank no matter how the depth of the tillage point varies. This positioning prevents soil exploded by the shank point from projecting outside of the blades, and ensures that there is sufficient soil to build a proper berm. The blades are adjustable for depth, angle, and distance between blades to permit the operator to maximize the containment of soil to build a berm. The blades may be dull-edge or sharp-edge, depending upon how much soil is to be moved. Dull blades tend to ride on top, while sharp blades tend to cut in.

Conditioning rotary reel assembly 20 is comprised of support arm 80 rigidly affixed at the forward end to coupler 30 and extending rearwardly therefrom in a cantilevered configuration. Support arm 80 is shown as two identical flat bars 82, 84 bolted to either side of coupler 30 and pivotably connected to reel arm 90 at pivot bolt 86. An adjustable compression spring 88 extends between support arm 80 and a stop plate 91 rigidly affixed to reel arm 90 such that the reel arm 90 may pivot about pivot bolt 86 to adjustably absorb movement of the rotary reel due to uneven areas of the ground or impacts with obstacles on the field. Most importantly, however, compression spring 88 adjusts the down pressure for controlling clod sizing.

In the preferred embodiment, a coulter is affixed forwardly of the shank 36 to either toolbar 12 or another toolbar or structural member of the implement frame in know fashion. Numerous examples exist in the prior art, but examples of such a coulter are shown in U.S. Pat. Nos. 5,797,460 and 6,102,132 and would prove satisfactory in the instant application. A coulter thus located results in cutting and sizing residue. The depth of cut of the coulter would be adjustable upwardly or downwardly within a clamp, and adjusted to accommodate or compensate for various settings of the tillage depth or soil conditions. General practice would be to use a coulter with a diameter of approximately 20 to 24-inches. The coulters may be either wavy or smooth depending upon desired results and working conditions; smooth being preferred. For in-row root cutting and less surface disruption, a smooth coulter would be selected. In any event, the primary purpose of the coulter is to cut the residue and cut a groove into the soil to enhance soil flow at the tillage point and equalize soil flow off of each side of the tillage point.

The final apparatus of the system is a conditioning rotary reel 100 that conditions the strip of soil to shape and pre-settle the berm, to give ideal seed-to-soil contact and uniform berm size, thus promoting early, fast and uniform emergence. The rotary reel of the instant invention is mounted to a yoke 102 on bearings to provide smooth and free relative rotation of the reel. The yoke 102 is affixed to reel arm 90 pivotally mounted to support arm 80. The reel assembly 20 is shown to include an adjustable spring 88, which would be adjusted as needed to maintain firm engagement between the conditioning rotary reel and the ground sufficient to break up clods. Generally, the larger the clods in the field, the greater the down pressure required. If down-pressure is required to augment the weight of the reel itself, any appropriate mechanism or approach can be used, such as, for example, spring packs or weights.

As the shank cuts through the soil, it explodes the soil outwardly where it contacts the gathering blades and is redirected inwardly toward the path of the shank. If the surface of the ground is level and the density is generally uniform, the soil exploded is uniform on the two sides of the shank, and is uniform when turned inwardly by the blades; however, as is more often the case, the ground is not level and the soil is not of uniform density, the exploded soil is not of equal volume on the two sides of the shank and, thus, the soil turned by the blades is not uniform and of equal volume. This lack of uniformity of volume and density causes the blade being hit by the higher volume to throw more soil inwardly, and to actually throw some soil all the way across the shank path and onto an untilled area of the ground. This situation presents a problem in that it does not provide sufficient volume of soil to build the desired berm. To avoid this, the conditioning rotary reel must be located close enough to the blades to catch the extra volume of soil and encompass it into the berm. Generally, this requires the conditioning rotary reel to be located in the range of 6 to 10 inches from the back of the blades.

Figure 2:
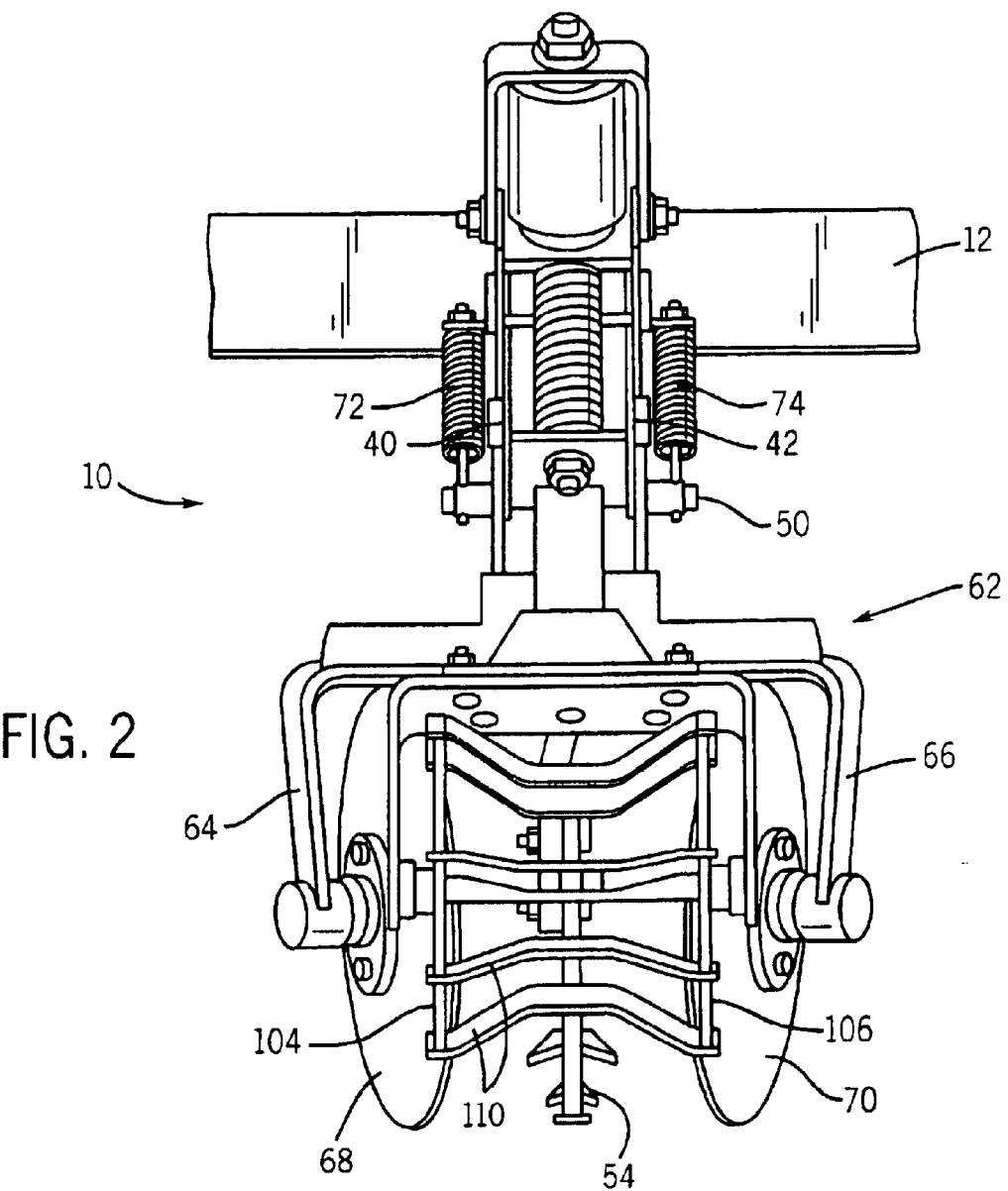
FIG. 2 is a rear elevational view of the working unit shown in FIG. 1.

Referring now to FIGS. 1–3, a general depiction of rotary reel 100 conforming to the teachings of the instant invention can be seen to include a pair of opposing end plates 104, 106. The end plates may be notched or scallop-shaped to reduce plugging in wet conditions and avoid creation of a groove beside the berm. The end plates are partially maintained in transverse alignment by a support shaft 108 that extends through centrally located apertures in each of the end plates. Support shaft 108 is affixed, as by welding, to each of the end plates and extends beyond each to fit into bearings on yoke 102. A plurality of elongate ground-engaging bars 110, made from flat stock, extends from end-to-end across the end plates and are affixed thereto. The end plates have slots, as at 112 in FIG. 1, into which the bars fit. After welding, this arrangement provides superior support and strength for the connection. While it is preferred that the bars be fabricated from flat stock, satisfactory results can be obtained by the use of other structures, such as, for example, bar stock or lengths of tubular material. It should be obvious to one of ordinary skill in the art that other methods and arrangements for affixing the bars to the end plates would provide a satisfactory structure.

Figure 4:
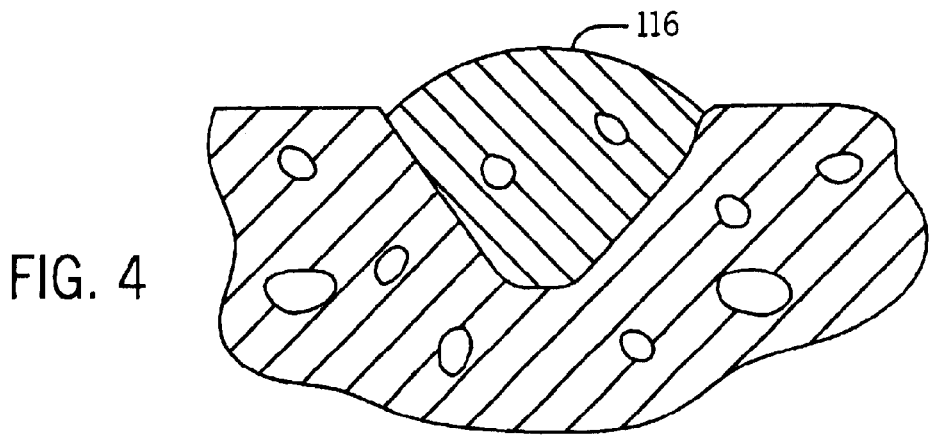
FIG. 4 is a cross-sectional view of the ground worked by the working unit of FIGS. 1–3.

Each of the bars 110 is, as can best be seen in FIG. 5, generally concave, or hat-shaped, in plan view. While the term "hat-shaped" is used herein to describe the planar configuration of the bars, it is intended merely as an aid in understanding, not a limitation. The plan view configuration may take any concave shape that will produce a useful shape for the berm created. The preferred embodiment is as shown in FIG. 5, and will produce a raised berm with a generally flat top. It should be understood, however, that almost any shape can be created and might vary for different crops or field conditions. In the preferred embodiment, the concave edge 114 is directed generally radially inwardly toward the axis of rotation of the conditioning rotary reel, as defined by the longitudinal axis of support shaft 108; however, the direction of the concave portion may vary from the radial direction and still prove satisfactory. The shape of the concave edge 114 is the chosen shape of the berm to be created, i.e., the shape of the berm as shown at 116 in FIG. 4 is determined by the configuration of the concave edge 114 of 110. The width of bars 110, and thus the width of conditioning rotary reel 100 is chosen or determined such that the outer flat portions, 118, 120 ride at least partially on untilled soil such that the conditioning rotary reel does not leave a groove beside the berm. As stated above, the shaped, concave portion of the bars can be modified in specific contour so as to achieve the same result or changed to build larger or smaller berms. The depth of the seedbed is determined by the operational depth setting of tillage point 54, and the height of the berm is established by the amount of soil turned up by the tillage point (plus the amount of air and residue mixed with the soil). The width of the berm is determined by the setting between blades 68, 70 and the width of conditioning rotary reel 100. By way of example, a satisfactory embodiment of the conditioning rotary reel is 11 inches wide with an end plate diameter of 14 inches, and a general depth for the concave portion of about 2 inches.

Both the gathering blades and the conditioning rotary reel are spring loaded to urge them to follow the ground contour and also provide the necessary down pressure to gather the proper amount of soil by the gathering blades and to provide clod pulverization with the conditioning rotary reel. Additionally, the gathering blades are adjustable in height.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. A strip-till primary tillage implement comprising:

a main frame having a forward end and an opposing rearward end and adapted to be pulled across the ground by a tractor in a direction of travel generally parallel to a line between said forward and rearward ends, said main frame including a toolbar having a length extending across the width of the implement transversely to the direction of travel of the tractor;

a working unit including:

a coupler adjustably attached to said toolbar and selectively locatable along the length of said toolbar, said coupler having a rigid main body portion;

a tillage shank affixed at a first point to said main body portion of said coupler and extending downwardly toward the ground, culminating in a tillage point, said tillage shank adapted to engage the ground to till and raise soil;

a pair of gathering blades, one on each side of said tillage shank, rotatably attached to a bracket arm pivotably affixed at a second point to said coupler, said gathering blades positioned adjacent and slightly rearward of said tillage shank to gather substantially all the soil turned up by said tillage shank and redirect it toward the path of said shank into a berm as it is drawn across the ground, said second point being located rearward of said first point such that said gathering blades substantially maintain their relative position with said tillage shank no matter how the depth of the tillage point varies as the implement is drawn across the ground; and a conditioning rotary reel affixed to said coupler and extending rearwardly and downwardly therefrom to contact the ground behind said pair of gathering blades to condition the soil gathered by said blades, said conditioning rotary reel rotatable on a support shaft having a first end and a second end, wherein said bracket arm is biased downwardly toward the around by an adjustable compression spring working between said coupler and said bracket arm, wherein said tillage shank is biased downwardly by an adjustable compression spring working between said coupler and said shank, and said tillage shank is pivotably affixed at said first point, wherein said conditioning rotary reel is affixed to a generally inverted u-shaped support yoke rotatably affixed to said first end and said second end of said support shaft such that said reel may rotate freely within the support yoke, and wherein said yoke is affixed to and depending generally downwardly and rearwardly from an elongate reel arm, which is itself pivotably connected to an elongate support arm rigidly affixed to and extending rearwardly from said coupler.

2. The implement of claim 1, wherein:

said reel arm is biased downwardly toward the ground by an adjustable compression spring working between said reel arm and said support arm.

3. The implement of claim 2, further including:

a plurality of said working units positioned along the length of said toolbar at regular intervals.

4. The implement of claim 3, wherein:

an adjustable coulter bracket is affixed to said main frame forward of each said working unit, having a rotatable coulter attached thereto for engagement with the ground forward of said shank.

5. In a strip-till primary tillage implement having a main frame with a forward end and an opposing rearward end and adapted to be pulled across the ground by a tractor in a direction of travel generally parallel to a line between said forward and rearward ends, said main frame including a toolbar having a length extending across the width of the implement transversely to the direction of travel of the tractor;

a working unit including:

a coupler adjustably attached to said toolbar and selectively locatable along the length of said toolbar, said coupler having a rigid main body portion extending generally rearwardly from said toolbar; and a tillage shank affixed at a first point to said main body portion of said coupler and extending downwardly toward the ground, culminating in a tillage point, said tillage shank adapted to engage the ground to till and raise the soil;

a conditioning rotary reel affixed to said coupler and extending rearwardly and downwardly therefrom to contact the ground behind said pair of gathering blades to condition the soil gathered by said blades, said conditioning rotary reel rotatable on a support shaft having a first end and a second end, the improvement comprising:

a pair of gathering blades, one on each side of said tillage shank, rotatably attached to a bracket arm pivotably affixed at a second point to said coupler, said gathering blades positioned forward of said conditioning rotary reel, adjacent and slightly rearward of said shank to gather substantially all the soil turned up by said tillage shank and redirect it toward the path of said shank into a berm as it is drawn across the ground, said second point being located rearward of said first point such that said gathering blades maintain their relative position with said shank no matter how the depth of the tillage point varies as the implement is drawn across the ground, wherein said bracket arm is biased downwardly toward the ground by an adjustable compression spring working between said coupler and said bracket arm, wherein said tillage shank is biased downwardly by an adjustable compression spring working between said coupler and said shank, and said shank is pivotably affixed at said first point, wherein said conditioning rotary reel is affixed to a generally inverted u-shaped support yoke rotatably affixed to said first end and said second end of said support shaft such that said reel may rotate freely within the support yoke, and wherein said yoke is affixed to and depending generally downwardly and rearwardly from an elongate reel arm, which is itself pivotably connected to an elongate support arm rigidly affixed to and extending rearwardly from said coupler.

6. The improvement of claim 5, wherein:

said reel arm is biased downwardly toward the ground by an adjustable compression spring working between said reel arm and said support arm.

7. The implement of claim 6, wherein:

an adjustable coulter bracket is affixed to said main frame forward of each said working unit, having a rotatable coulter attached thereto for engagement with the ground forward of said shank.

8. A strip-till primary tillage implement comprising:

a main frame having a forward end and an opposing rearward end and adapted to be pulled across the ground by a tractor in a direction of travel generally parallel to a line between said forward and rearward ends, said main frame including a toolbar having a length extending across the width of the implement transversely to the direction of travel of the tractor;

a working unit including:
    a coupler adjustably attached to said toolbar and selectively locatable along the length of said toolbar, said coupler having a rigid main body portion extending generally rearwardly from said toolbar;
    a tillage shank affixed at a first point to said main body portion of said coupler and extending downwardly toward the ground, culminating in a tillage point, said tillage shank adapted to engage the ground to till and raise the soil, and a pair of gathering blades, one on each side of said tillage shank, rotatably attached to a bracket arm pivotably affixed at a second point to said coupler, said gathering blades positioned adjacent and slightly rearward of said shank to gather substantially all the soil turned up by said tillage shank and redirect it toward the path of said shank into a berm as it is drawn across the ground, said second point being located rearward of said first point such that said gathering blades maintain their relative position with said shank no matter how the depth of the tillage point varies as the implement is drawn across the ground; and
    a conditioning rotary reel affixed to said coupler and extending rearwardly and downwardly therefrom to contact the ground behind said pair of gathering blades to condition the soil gathered by said blades, said conditioning rotary reel rotatable on a support shaft having a first end and a second end, wherein said bracket arm is biased downwardly toward the ground by an adjustable compression spring working between said coupler and said bracket arm, wherein said tillage shank is biased downwardly by an adjustable compression spring working between said coupler and said shank, and said shank is pivotably affixed at said first point, wherein said conditioning rotary reel is affixed to a generally inverted u-shaped support yoke rotatably affixed to said first end and said second end of a said support shaft such that said reel may rotate freely within the support yoke, and wherein said yoke is affixed to and depending generally downwardly and rearwardly from an elongate reel arm, which is itself pivotably connected to an elongate support arm rigidly affixed to and extending rearwardly from said coupler.

9. The implement of claim 8, wherein:

said reel arm is biased downwardly toward the ground by an adjustable compression spring working between said reel arm and said support arm.

10. The implement of claim 9, further including:

a plurality of said working units positioned along the length of said toolbar at regular intervals.

11. The implement of claim 10, wherein:

an adjustable coulter bracket is affixed to said main frame forward of each said working unit, having a rotatable coulter attached thereto for engagement with the ground forward of said shank.

12. A strip-till primary tillage implement, comprising:

a main frame adapted to be pulled by a tow vehicle, said main frame including a toolbar extending transverse to a direction of travel of the tow vehicle;

a working unit including:
    a coupler configured to adjustably attach in a plurality of positions to said toolbar;
    a fore-and-aft extending support arm rigidly affixed to said coupler;
    a fore-and-aft extending reel arm pivotally coupled to said fore-and-aft extending support arm;
    a tillage shank affixed at a first point to said coupler; and
    a pair of gathering blades rotatably attached to a bracket arm pivotably affixed to a second point of said coupler;
    a u-shaped support yoke affixed to said fore-and-aft extending reel arm; and
    a conditioning rotary reel configured to pulverize soil behind said pair of gathering blades, wherein said conditioning rotary reel is supported to rotate freely within the u-shaped support yoke, wherein said bracket arm is biased downwardly toward the ground by an adjustable compression spring working between said coupler and said bracket arm, wherein said tillage shank is biased downwardly by an adjustable compression spring working between said coupler and said shank, and said shank is pivotably affixed at said first point, and wherein said u-shaped support yoke is affixed to and depending generally downwardly and rearwardly from an elongate reel arm, which is itself pivotably connected to an elongate support arm rigidly affixed to and extending rearwardly from said coupler.

\* \* \* \* \*